United States Patent
Manne et al.

(10) Patent No.: US 9,026,739 B2
(45) Date of Patent: May 5, 2015

(54) MULTIMODE PREFETCHER

(75) Inventors: Srilatha Manne, Portland, OR (US);
Nitya Ranganathan, Bangalore (IN);
Paul Keltcher, Lexington, MA (US);
Donald W. McCauley, Lakeway, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 319 days.

(21) Appl. No.: 13/414,526

(22) Filed: Mar. 7, 2012

(65) Prior Publication Data

US 2013/0238861 A1     Sep. 12, 2013

(51) Int. Cl.
*G06F 13/20* (2006.01)
*G06F 12/08* (2006.01)

(52) U.S. Cl.
CPC ........ *G06F 12/0862* (2013.01); *G06F 12/0897* (2013.01); *G06F 2212/1024* (2013.01); *G06F 2212/502* (2013.01); *G06F 2212/6026* (2013.01)

(58) Field of Classification Search
CPC .................................................. G06F 12/0862
USPC ........................................ 711/137, 118, 213
See application file for complete search history.

(56) References Cited

U.S. PATENT DOCUMENTS

| 7,774,578 | B2 | 8/2010 | Keltcher |
| 2002/0087794 | A1* | 7/2002 | Jouppi et al. .................. 711/126 |
| 2011/0072218 | A1 | 3/2011 | Manne et al. |

OTHER PUBLICATIONS

Somogyi, Stephen, "Spatio-Temporal Memory Streaming," Proceedings of the 36th International Symposium on Computer Architecture, Jun. 2009, pp. 1-12.

* cited by examiner

*Primary Examiner* — Jae Yu
(74) *Attorney, Agent, or Firm* — Abel Law Group, LLP

(57) ABSTRACT

One or more lines of a cache are prefetched according to a first prefetch routine while training a prefetcher to prefetch one or more lines of the cache according to a second prefetch routine. In response to determining that the prefetcher has been trained, one or more lines of the cache may be prefetched according to the second prefetch routine.

18 Claims, 4 Drawing Sheets

MULTIMODE PREFETCHER

BACKGROUND

1. Field of the Invention

The present disclosure relates generally to computing systems and more specifically to prefetchers for computing systems.

2. Description of the Related Art

As processor performance improves, memory latency can be problematic in computer systems. Caches can reduce the average latency of load operations by storing frequently used data in structures that have a shorter latency than system memory. However, caches can suffer from cold misses (i.e., misses where the data has never been requested before) and capacity misses, where the cache is too small to hold all the data required by the application. Accordingly, to ensure usefulness of a cache, various prefetch routines can be used in connection with the cache.

SUMMARY OF EMBODIMENTS OF THE INVENTION

In at least one embodiment, a method includes prefetching one or more lines of a cache according to a first prefetch routine while training a prefetcher to prefetch one or more lines of the cache according to a second prefetch routine. In at least one embodiment, the method further includes determining that the prefetcher has been trained, and in response to determining that the prefetcher has been trained, prefetching one or more lines of the cache according to the second prefetch routine.

In at least one embodiment, an apparatus includes a cache and a prefetcher. The prefetcher includes logic configured to prefetch one or more lines of the cache according to a first prefetch routine until training associated with a second prefetch routine is completed. In at least one embodiment of the apparatus, the prefetcher further includes logic configured to prefetch one or more lines of the cache according to the second prefetch routine after training of the second prefetch routine is completed.

In at least one embodiment, a tangible computer-readable medium stores a computer readable representation of an integrated circuit. The computer readable representation includes a representation of a cache and a prefetcher that includes logic configured to prefetch one or more lines of the cache according to a first prefetch routine until training associated with a second prefetch routine is completed. In at least one embodiment of the tangible computer-readable medium, the computer readable representation further comprises a representation of an execution core, the execution core and the prefetcher each coupled to the cache.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

To make caches more effective, data prefetchers may be used to prefetch data to a cache prior to when the data is actually requested by an application. When effective, prefetchers boost performance by reducing the average latency of load operations. However, prefetchers can also be detrimental to performance in a number of ways.

First, prefetchers generate requests that are filtered through the cache tag array before the request can be sent to subsequent levels of cache or memory. If the prefetch request hits in the tag array, then the prefetch request is squashed. Although these squashed requests do not generate traffic beyond the current cache, they do contend with demand requests that are also trying to access the tag array. In addition, the squashed requests consume energy without providing an overall performance benefit.

A second way that prefetchers may degrade performance is by either prefetching useful cache lines too early, or by prefetching cache lines that are unused by the application. Both these scenarios result in unnecessary energy consumption. In addition, the prefetcher may displace potentially useful data in the cache with untimely or useless prefetches, resulting in a performance loss.

Prefetchers can be implemented with varying degrees of complexity. An example of a simple prefetcher is the sequential line prefetcher. The sequential line prefetcher may assume sequential locality and prefetch a next (or previous) cache line. While more complex prefetchers require some number of training events to determine a pattern before prefetch events can be generated, sequential line prefetchers require no training, and can begin prefetching immediately. This allows sequential line prefetchers to prefetch requests that might be missed by the more complex prefetchers while training.

The complex prefetchers may be unable to capture such prefetches for a number of reasons. First, complex prefetchers may require a significant amount of time to determine a pattern before generating prefetches. Second, the prefetcher tables for the complex prefetchers have limited capacity and cannot retain patterns indefinitely. Therefore, for patterns that do not repeat often, the knowledge from the previous instance of the pattern may be lost due to prefetcher table contention and must be recomputed.

Although the sequential line prefetcher helps performance in some cases, it can also generate spurious prefetches that, depending on the specific application and cache size, can have a detrimental impact on performance. Accordingly, system performance could be enhanced by using one prefetcher (e.g., a sequential line prefetcher) in connection with another prefetcher (e.g., a more complex prefetcher) without incurring the performance degradation seen by the sequential line prefetcher.

Figure 1:
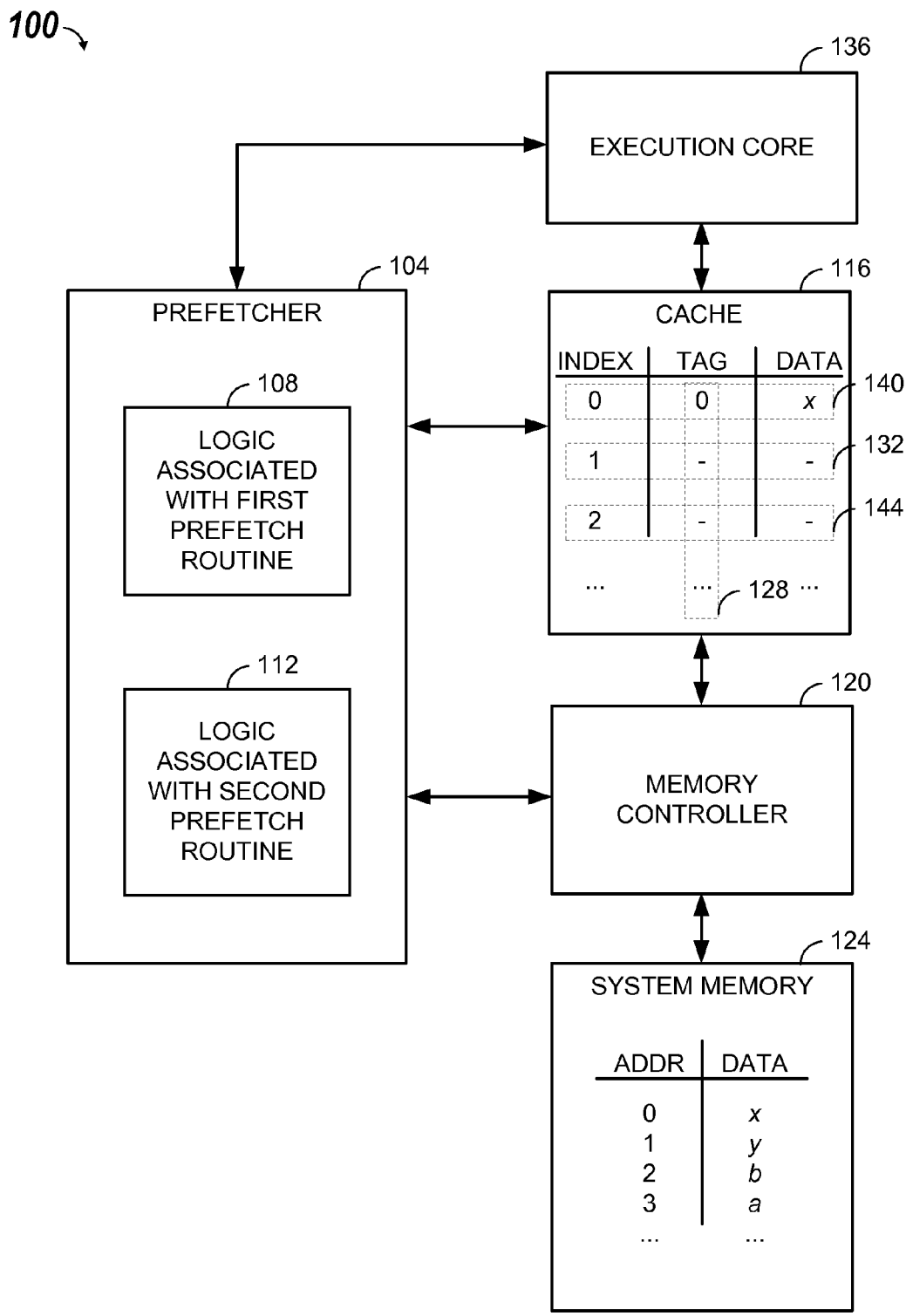
FIG. 1 is a block diagram of a system according to at least one embodiment of the invention.

Referring to FIG. 1, system 100 includes prefetcher 104, which includes logic 108 associated with a first prefetch routine and logic 112 associated with a second prefetch routine. Logic 108 and logic 112 may be configured to perform respective prefetch routines (e.g., a default prefetch routine that prefetches while a more complex prefetch routine trains on a pattern), as described further below.

Prefetcher 104 is coupled to cache 116 and to memory controller 120. In at least one embodiment, prefetcher 104 issues prefetch requests to cache 116. For example, suppose prefetcher 104 determines (e.g., via the first or second prefetch routine, as described further below) that data x, which is stored at memory address 0 of system memory 124, should be prefetched. Prefetcher 104 may issue a request to prefetch data x, which may be filtered through tag array 128 of cache 116. If the request "hits" in tag array 128, then the prefetch request may be squashed. For example, as shown in FIG. 1, the memory address 0 is currently contained in tag array 128, so a request to prefetch data x "hits" in tag array 128 and the prefetch request is squashed (since data x is currently contained in cache line 140).

Suppose prefetcher 104 determines that data y, which is stored at memory address 1 of system memory 124, should be prefetched. Prefetcher 104 may issue a corresponding prefetch request, which may be filtered through tag array 128. As shown in FIG. 1, the memory address corresponding to data y (i.e., memory address 1 of system memory 124) is not currently contained in tag array 128. Accordingly, the prefetch request for data y should be routed to a lower level of cache (if present) or (as shown in FIG. 1) system memory 124 via memory controller 120. Memory controller 120 may then load a cache line of cache 116 with data y and other suitable information (e.g., a tag entry indicating memory address 1 of system memory 124 and an index value that indexes cache lines of cache 116).

In at least one embodiment, if during the prefetch of data y all cache lines of cache 116 are populated, then one of the cache lines may be evicted (e.g., using a suitable cache eviction technique) and then populated with data y and the other suitable information. FIG. 1 depicts that cache lines 132 and 144 are currently available, so in this case no data needs to be evicted from cache 116.

Execution core 136 may also access cache 116. For example, execution core 136 may issue demand requests (e.g., for data to be used during execution of applications), which may be filtered through cache 116. If the demand requests do not "hit" in tag array 128 (or in another level of cache, if available), the demand requests result in a demand request cache miss and pass to system memory 124 via memory controller 120, which may provide an interface between execution core 136 and system memory 124 (e.g., by loading cache lines into cache 116 in response to demand request cache misses). As noted above, excessive squashed prefetch requests from a prefetcher can compete with demand requests from execution core 136 and thus can degrade performance of execution core 136. Accordingly, it would be beneficial for prefetcher 104 to populate cache 116 with useful data without generating a large number of squashed prefetch requests.

In at least one embodiment, prefetcher 104 is configured to use logic 108 to perform a first prefetch routine while logic 112 trains to perform a second prefetch routine. For example, logic 108 may perform a default stride-n prefetch routine while logic 112 is not generating prefetch requests (e.g., while logic 112 trains to determine a pattern). One example of a stride-n prefetch routine is to prefetch a next or previous cache line next to a cache line to be fetched (i.e., n=+1 or −1). For example, if each cache line of cache 116 is 64 bytes, then a demand request cache miss would cause 128 bytes of data (rather than 64 bytes) to be loaded into cache 116. The sequential prefetch routine described above is the case of a stride-n prefetch routine where n=1.

Such stride prefetch routines may incur fewer or no misses during training and may not suffer from capacity problems (e.g., inability to retain pattern information indefinitely) as compared to more complex prefetch routines (e.g., pattern-based routines). However, as noted above, sequential prefetching can also generate a large number of spurious prefetch requests by always additionally prefetching the other half of each cache line pair even when the additional data are not used by execution core 136. Accordingly, in at least one embodiment, logic 108 prefetches according to a default prefetch routine (e.g., a default stride prefetch routine) while logic 112 is training to recognize a pattern. Once logic 112 is trained and begins to generate prefetches according to a second prefetch routine, prefetching is then performed according to the second prefetch routine and the first prefetch routine is disabled (e.g., disabled using an appropriate chooser mechanism, such as selection logic, which may be included in prefetcher 104).

The second prefetch routine may be a more complex prefetch routine than the first prefetch routine (e.g., a prefetch routine that uses training to determine a stride count). To further illustrate, in at least one embodiment, logic 108 examines memory addresses in portions of code to determine a pattern. If the examined addresses are consistently spaced apart from one another by a common stride of n (e.g., the most common memory address offset separating successive demand requests observed over a series of demand requests), then logic 108 may train to prefetch cache lines that include data at the regularly spaced addresses at system memory 124. In at least one embodiment, execution core 136 analyzes instructions and indicates to logic 108 that the addresses of requested data are typically spaced at regular intervals from one another at system memory 124 by a stride of n. In at least one embodiment, the second prefetch routine can also train to determine the stride count of the first prefetch routine by determining a common stride n. Afterward, the common stride n can be used as the default prefetch routine.

Various prefetch devices and methods are described in U.S. Pat. No. 7,774,578, filed Jun. 7, 2006, entitled "Apparatus and Method of Prefetching Data in Response to a Cache Miss," and naming as inventor Paul. S. Keltcher, the disclosure of which is incorporated by reference herein in its entirety, and in U.S. Patent Application Publication No. 2011/0072218, filed Sep. 24, 2009, entitled "Prefetch Promotion Mechanism to Reduce Cache Pollution," and naming as inventors Srilatha Manne, Steven K. Reinhardt, and Lisa Hu, the disclosure of which is also incorporated by reference herein in its entirety.

As will be appreciated, by using logic 108 to prefetch according to the first prefetch routine when cache 116 would otherwise not contain data (e.g., during training associated with the second prefetch routine), cache misses can be reduced or avoided. Further, by discontinuing the first prefetch routine once the training is completed, performance degradation due to tag or cache pollution is reduced. Further, it will be appreciated that a variety of prefetch routines may be implemented as the first and second prefetch routines depending on the given application.

Various additional or alternate embodiments of system 100 of FIG. 1 are contemplated. For example, in at least one embodiment of system 100, prefetcher 104, cache 116, and execution core 136 are integrated within a processor. System memory 124 may be external to the processor or may be a memory that is integrated within the processor. In addition, system memory 124 may be shared with multiple processors or processor cores. While system 100 depicts a single prefetcher (i.e., prefetcher 104) and a single cache (i.e., cache 116), it should be appreciated that system 100 can also include multiple levels of cache (e.g., organized in a hierarchy) and multiple prefetchers each corresponding to one of the multiple levels of cache. As another example, alternatively or in addition, prefetcher 104 may be implemented as multiple discrete components rather than a single component. Further, while the foregoing description of FIG. 1 has described prefetch requests in system 100 being generated in response to cache misses, those of skill in the art will recognize that prefetch requests can be generated in response to cache hits at cache 116 or in response to both cache hits and misses at cache 116.

Figure 2:
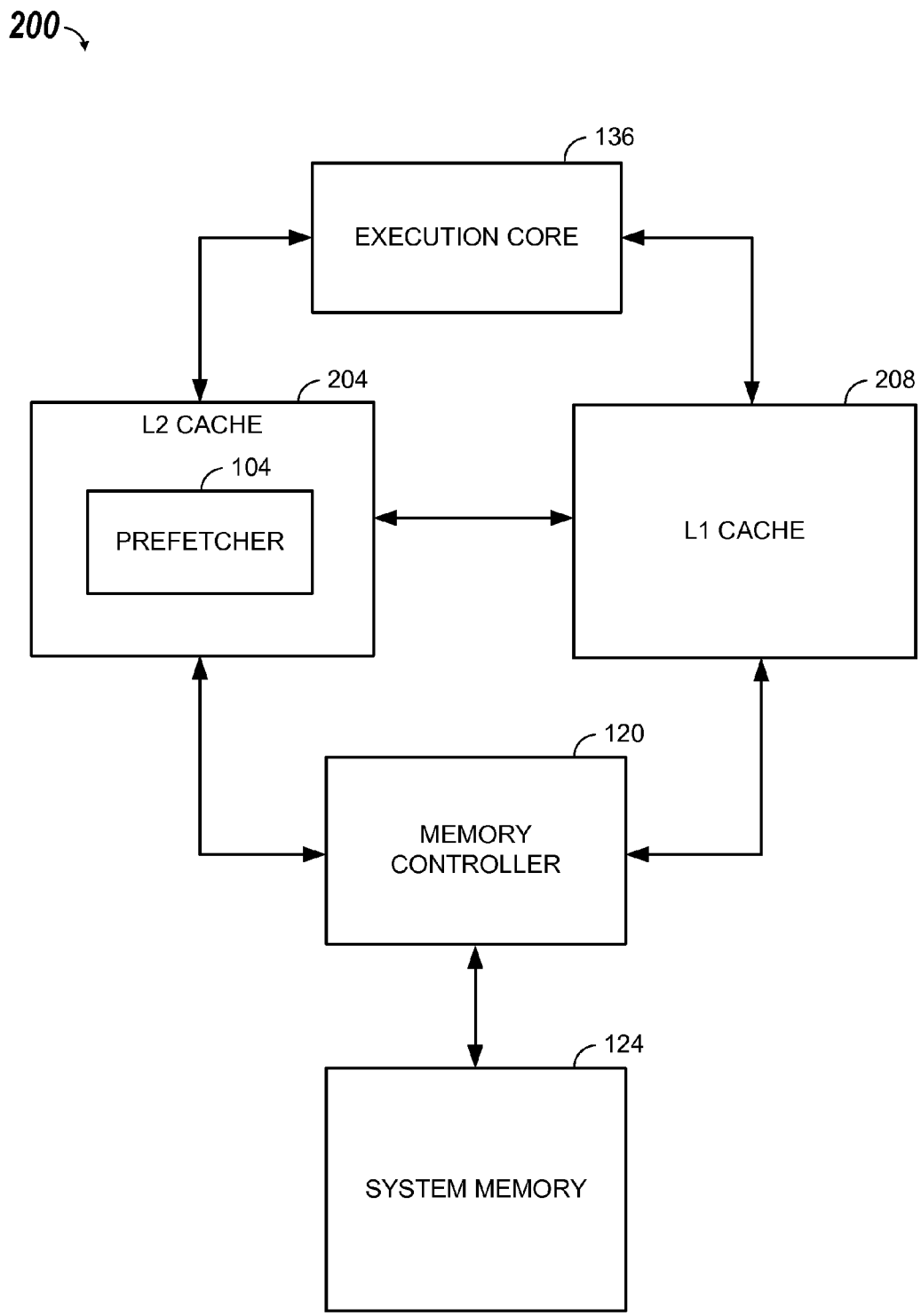
FIG. 2 is a block diagram of a system according to at least one embodiment of the invention.

FIG. 2 illustrates another example embodiment of prefetcher 104. As shown in FIG. 2, system 200 includes prefetcher 104, memory controller 120, system memory 124, and execution core 136 of FIG. 1. In the embodiment of FIG. 2, L2 cache 204 includes prefetcher 104 and is coupled to L1 cache 208. L1 cache 208 and L2 cache 204 may function similarly to cache 116 as described with reference to FIG. 1.

In at least one embodiment, L2 cache 204 receives information regarding operation of L1 cache 208. For example, L2 cache 204 may receive information about any of prefetches, cache hits, and cache misses associated with operation of L1 cache 208. Such information may be received from execution core 136 or by monitoring traffic on buses coupled to L1 cache 208. In at least one embodiment, logic 112 of prefetcher 104 (as described with reference to FIG. 1) trains based on the information to determine an appropriate prefetch routine with which to prefetch cache lines of L2 cache 204 while logic 108 prefetches cache lines of L2 cache 204 based on a default prefetch routine, such as a sequential prefetch routine. While FIG. 2 depicts prefetcher 104 integrated within L2 cache 204, it should be appreciated that prefetcher 104 may be used in conjunction with any level of cache.

Figure 3:
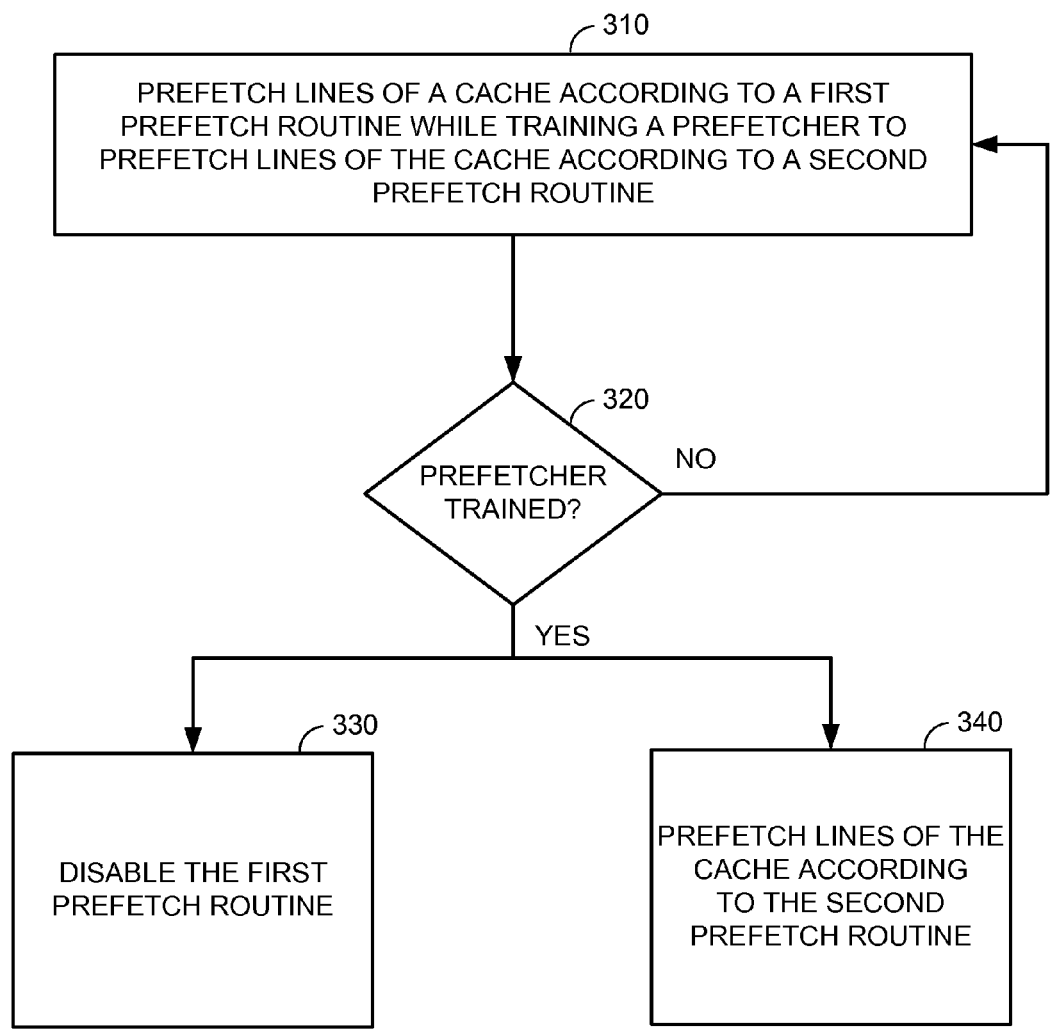
FIG. 3 is a flow diagram that illustrates prefetching cache lines according to at least one embodiment of the invention.

Referring to FIG. 3, a flow diagram illustrating prefetching cache lines is depicted and generally designated 300. Operation corresponding to flow diagram 300 may be performed by suitable devices that prefetch data, such as system 100 of FIG. 1 and system 200 of FIG. 2.

Flow diagram 300 includes prefetching lines of a cache according to a first prefetch routine while training a prefetcher to prefetch lines of the cache according to a second prefetch routine, at 310. According to an illustrative embodiment, the prefetcher, cache, and first prefetch routine of flow diagram 300 are prefetcher 104, cache 116, and a sequential prefetch routine, respectively, as described with reference to FIGS. 1 and 2. The second prefetch routine may include analyzing instructions to determine a pattern, such as determining that the addresses of requested data are typically offset at regular intervals by a stride of n.

Flow diagram 300 further includes determining whether the prefetcher has completed training (e.g., has trained to prefetch according to the second prefetch routine), at 320. In at least one embodiment, the prefetcher trains by recognizing patterns in data used by an execution core, such as execution core 136 of FIGS. 1 and 2. Based on the given application, training may continue in order to establish a threshold "confidence" level in the pattern, or training may be completed as soon as a pattern is recognized. In either case, if at 320 training has not completed, then flow diagram 300 continues prefetching lines of the cache according to the first prefetch routine while training the prefetcher to prefetch lines of the cache according to the second prefetch routine, at 310.

If at 320 it is determined that the prefetcher has completed training, then the first prefetch routine is disabled, at 330, and lines of the cache are prefetched according to the second prefetch routine, at 340. Disabling the first prefetch routine may include disabling logic associated with the first prefetch routine, such as logic 108 of FIG. 1, or simply ceasing to prefetch according to the first prefetch routine. As will be appreciated, flow diagram 300 of FIG. 3 may be utilized in a wide variety of contexts to increase the number of useful cache lines in a cache while not generating a large number of spurious prefetch requests.

Figure 4:
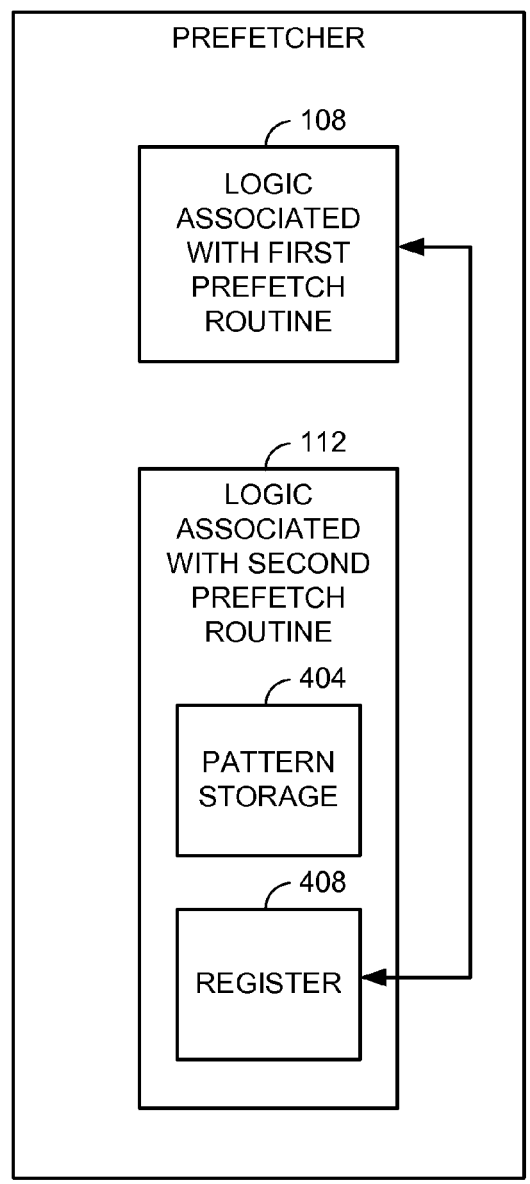
FIG. 4 is a block diagram of a prefetcher according to at least one embodiment of the invention.

FIG. 4 depicts a particular illustrative embodiment of prefetcher 104 of FIGS. 1 and 2. As shown in FIG. 4, logic 112 may include pattern storage 404, which may include memory (e.g., a cache) to store patterns determined by logic 112 used to generate prefetch requests associated with the second prefetch routine. In at least one embodiment, logic 112 refers to data patterns stored at pattern storage 404 to generate prefetch requests to cache 116 of FIG. 1.

While prefetching according to the second prefetch routine, cache misses may still occur for a variety of reasons. One such reason is that pattern storage 404 is of finite capacity and some patterns can be overwritten by more recently used patterns (e.g., according to a cache eviction protocol). Further, patterns associated with the instructions executed and data used by execution core 136 of FIG. 1 may change. Accordingly, in at least one embodiment, prefetcher 104 is configured to revert to the first prefetch routine (e.g., a stride prefetch routine) using logic 108 in response to a cache miss that occurs during prefetching according to the second prefetch routine (e.g., a pattern-based prefetch routine). After operation reverts to the first prefetch routine, logic 112 may retrain based on currently executing instructions, particularly if environmental factors have changed that alter patterns in demand requests (e.g., a new application has begun executing). Prefetching according to the first prefetch routine may continue until the second prefetch routine has trained or retrained. Once logic 112 retrains to determine a pattern, the pattern may be stored at pattern storage 404 and prefetching according to a third prefetch routine (e.g., a prefetch routine based on the retrained pattern) can begin.

In at least one embodiment, logic 112 includes register 408. As described above, logic 108 may be associated with a default prefetch routine of a stride n. In at least one embodiment, in addition to being configured to train on the second prefetch routine, logic 112 is further configured to determine a common stride n and to store an indication of the common stride n in register 408. Logic 108 may be configured to read the contents of register 408 (e.g., the common stride n) and to use the common stride n in a stride-n prefetch routine in cases where operation reverts back to the first prefetch routine.

Physical structures and circuits described herein may be embodied in computer-readable descriptive form suitable for use in subsequent design, simulation, test or fabrication stages. Various embodiments are contemplated to include circuits, systems of circuits, related methods, and tangible computer-readable media having encodings thereon (e.g., VHSIC Hardware Description Language (VHDL), Verilog, GDSII data, Electronic Design Interchange Format (EDIF), Gerber file) of such circuits, systems, and methods.

Computer-readable media may store instructions as well as data that can be used to implement the embodiments described herein. The instructions/data may be related to hardware, software, firmware or combinations thereof. In at least one embodiment, instructions, data, or a combination thereof are stored on a non-transitory (e.g., tangible) storage medium, where the instructions are executable to cause a prefetcher (e.g., prefetcher 104 of FIGS. 1, 2, and 4) to prefetch lines of a cache (e.g., cache 116 of FIG. 1) according to a first prefetch routine until the prefetcher completes training associated with a second prefetch routine, as well as to perform other techniques described herein.

The description of the invention set forth herein is illustrative, and is not intended to limit the scope of the invention as set forth in the following claims. For example, structures and functionality presented as discrete components in the exemplary configurations herein may be implemented as a combined structure or component, and vice versa. Other variations and modifications of the embodiments disclosed herein may be made based on the description set forth herein without departing from the scope and spirit of the invention as set forth in the following claims.

What is claimed is:

1. A method comprising:
prefetching one or more lines of a cache according to a first prefetch routine while training a prefetcher to prefetch one or more lines of the cache according to a second prefetch routine; and
prefetching one or more lines of the cache according to the second prefetch routine in accordance with the training, the training including recognizing a pattern of addresses consistently spaced apart, the second prefetch routine being a stride-n prefetch routine where stride-n corresponds to how far apart the addresses are spaced.

2. The method as recited in claim 1, wherein the training of the prefetcher includes analyzing portions of code to determine the pattern.

3. The method as recited in claim 2 wherein analyzing the portions of code includes detecting how far apart the addresses are located in the code.

4. The method as recited in claim 2 wherein the prefetching one or more lines of the cache according to the second prefetch routine is responsive to completing the training.

5. The method as recited in claim 1 wherein the first prefetch routine is a sequential prefetch routine.

6. The method as recited in claim 5 further comprising:
detecting, while training the prefetcher, a cache miss associated with a first memory address; and
in response to detecting the cache miss, prefetching a first cache line and a second cache line,
wherein the first cache line is located at the first memory address and wherein the second cache line is located at a second memory address that is sequential with respect to the first memory address.

7. A method comprising:
prefetching one or more lines of a cache according to a first prefetch routine while training a prefetcher to prefetch one or more lines of the cache according to a second prefetch routine;
in response to determining that the prefetcher has been trained, prefetching one or more lines of the cache according to the second prefetch routine; and
in response to detecting a cache miss while prefetching according to the second prefetch routing, retraining the prefetcher to prefetch according to a third prefetch routine while prefetching one or more lines of the cache according to the first prefetch routine.

8. An apparatus comprising:
a cache; and
a prefetcher including,
first logic configured to prefetch one or more lines of the cache according to a first prefetch routine until training associated with a second prefetch routine is completed; and
second logic configured to prefetch one or more lines of the cache according to the second prefetch routine after the training is completed, the training including recognizing an offset pattern for a plurality of addresses, the second prefetch routine being a stride-n prefetch routine where stride-n corresponds to the offset pattern.

9. The apparatus as recited in claim 8 further comprising an execution core, the execution core and the prefetcher each coupled to the cache.

10. The apparatus as recited in claim 8 further comprising a memory device configured to store data, wherein the prefetcher is further configured to populate the cache with data from the memory device.

11. The apparatus as recited in claim 8 wherein the first prefetch routine is a sequential prefetch routine and wherein the second prefetch routine is a pattern-based prefetch routine.

12. The apparatus as recited in claim 8, wherein the second logic includes storage configured to store patterns associated with the second prefetch routine.

13. The apparatus as recited in claim 8, wherein the second logic is further configured to determine a common stride observed over a sequence of demand requests to the cache, the common stride corresponding to the offset pattern.

14. The apparatus as recited in claim 13 further comprising a register to maintain an indication of the common stride, the first logic coupled to the register.

15. A tangible computer-readable medium storing a computer readable representation of an integrated circuit, the computer readable representation comprising a representation of a prefetcher that includes logic configured to prefetch one or more lines of the cache according to a first prefetch routine until training associated with a second prefetch routine is completed, the training recognizing a pattern of addresses consistently spaced apart, the second prefetch routine being a stride-n prefetch routine where stride-n corresponds to how far apart the addresses are spaced.

16. The tangible computer-readable medium as recited in claim 15 wherein the computer readable representation further comprises a representation of an execution core, the execution core and the prefetcher each coupled to the cache.

17. The tangible computer-readable medium as recited in claim 15 wherein the first prefetch routine is a sequential prefetch routine and wherein the second prefetch routine is a pattern-based prefetch routine.

18. The tangible computer-readable medium as recited in claim 15 wherein the computer readable representation further comprises a representation of logic configured to prefetch one or more lines of a cache according to the second prefetch routine after training of the second prefetch routine is completed.

* * * * *